US010546364B2

(12) United States Patent
Bastani et al.

(10) Patent No.: US 10,546,364 B2
(45) Date of Patent: Jan. 28, 2020

(54) SMOOTHLY VARYING FOVEATED RENDERING

(71) Applicant: GOOGLE LLC, Mountain View, CA (US)

(72) Inventors: Behnam Bastani, San Jose, CA (US); Brian Funt, Vancouver (CA); Sylvain Vignaud, Zurich (CH); Haomiao Jiang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/000,305

(22) Filed: Jun. 5, 2018

(65) Prior Publication Data
US 2018/0350032 A1 Dec. 6, 2018

Related U.S. Application Data

(60) Provisional application No. 62/515,124, filed on Jun. 5, 2017.

(51) Int. Cl.
G06T 3/00 (2006.01)
G06T 19/00 (2011.01)
G06T 15/20 (2011.01)
G06T 1/60 (2006.01)
G06F 3/01 (2006.01)

(52) U.S. Cl.
CPC ............ G06T 3/0093 (2013.01); G06T 15/20 (2013.01); G06T 19/00 (2013.01); G06F 3/013 (2013.01); G06T 1/60 (2013.01); G06T 2200/04 (2013.01); G06T 2210/36 (2013.01); G06T 2210/44 (2013.01)

(58) Field of Classification Search
None
See application file for complete search history.

(56) References Cited

U.S. PATENT DOCUMENTS

| 2008/0101711 | A1* | 5/2008 | Kalker | G06T 3/00 |
| | | | | 382/254 |
| 2008/0158226 | A1* | 7/2008 | Shimizu | G02B 13/06 |
| | | | | 345/420 |
| 2015/0287167 | A1* | 10/2015 | Cerny | G06T 17/10 |
| | | | | 345/423 |
| 2017/0124760 | A1* | 5/2017 | Murakawa | G06T 15/005 |
| 2017/0287112 | A1* | 10/2017 | Stafford | G06F 3/013 |
| 2017/0287446 | A1* | 10/2017 | Young | G09G 5/391 |

(Continued)

OTHER PUBLICATIONS

Ram, Indradeo, and Paul Siebert. "A computational model of the log-polar retina mosaic for local feature extraction." 2010 10th International Conference on Intelligent Systems Design and Applications. IEEE, 2010.*

(Continued)

*Primary Examiner* — Ryan M Gray
(74) *Attorney, Agent, or Firm* — Brake Hughes Bellermann LLP

(57) ABSTRACT

Systems and methods for performing foveated rendering are provided. An example system and method may warp a 3D scene based on a fixation point. The system and method may also render the warped 3D scene to generate a first image. The system and method may also unwarp the first image to generate a second image. For example, the first image may have fewer pixels than the second image.

21 Claims, 13 Drawing Sheets

(56) References Cited

U.S. PATENT DOCUMENTS

| | | | |
|---|---|---|---|
| 2018/0081429 A1* | 3/2018 | Akenine-Moller | G06F 3/011 |
| 2018/0256316 A1* | 9/2018 | Deering | G02B 13/0085 |
| 2018/0350036 A1* | 12/2018 | VanReenen | G06T 15/04 |

OTHER PUBLICATIONS

International Search Report and Written Opinion for International Application No. PCT/US2018/036033, dated Oct. 24, 2018, 14 pages.

Koskela, Matias et al., "Foveated Path Tracing", ISVC 2016, Part I, LNCS 10072, pp. 723-732, 2016, XP047364702.

Mark, William R. et al., "Post-Rendering 3D Warping", 1997 Symposium on Interactive 3D Graphics, Apr. 27-30, 1997, 10 pages, XP058285072.

Weier, Martin et al., "Foveated Real-Time Ray Tracing for Head-Mounted Displays", Computer Graphics Forum, vol. 35, No. 7, Oct. 27, 2018, pp. 289-298, XP055461426.

Chacos, Brad, "NVIDIA's Radical Multi-Resolution Shading Tech Could Help VR Reach The Masses", available online at <https://www.pcworld.com/article/2926083/nvidias-radical-multi-resolution-shading-tech-could-help-vr-reach-the-masses.html>, May 31, 2015, 5 pages.

Demoreuille, Pete, "Optimizing the Unreal Engine 4 Renderer for VR", available online at <https://developer.oculus.com/blog/introducing-the-oculus-unreal-renderer/>, May 25, 2016, 4 pages.

Guenter et al., "Foveated 3D Graphics", available online at <https://www.microsoft.com/en-us/research/wp-content/uploads/2012/11/foveated_final15.pdf>, Nov. 20, 2012, 10 pages.

Guenter et al., "Supplement to Foveated 3D Graphics: User Study Details", available online at <https://www.microsoft.com/en-us/research/wp-content/uploads/2012/11/userstudy07.pdf>, 2012, 4 pages.

Kalloniatis et al., "Visual Acuity", available online at <http://webvision.med.utah.edu/book/part-viii-gabac-receptors/visual-acuity/>, retrieved on Jun. 5, 2018, 17 pages.

Luebke et al., "NVIDIA Partners with SMI on Innovative Rendering Technique That Improves VR", available online at <https://blogs.nvidia.com/blog/2016/07/21/rendering-foveated-vr/>, Jul. 21, 2016, 6 pages.

Mason, Will, "SMI Showcases Foveated Rendering With New 250Hz Eye Tracking Kit", available online at <https://uploadvr.com/smi-eye-tracking-foveated-rendering-exclusive/>, Jan. 2, 2016, 9 pages.

* cited by examiner

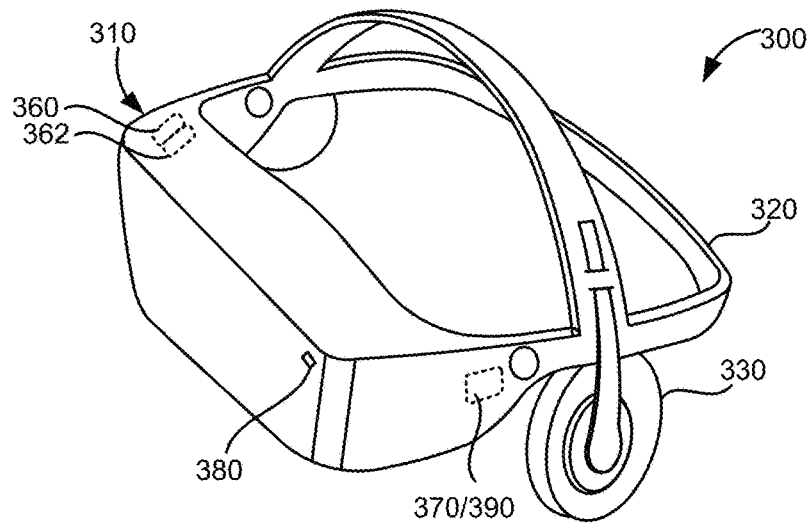
FIG. 3A
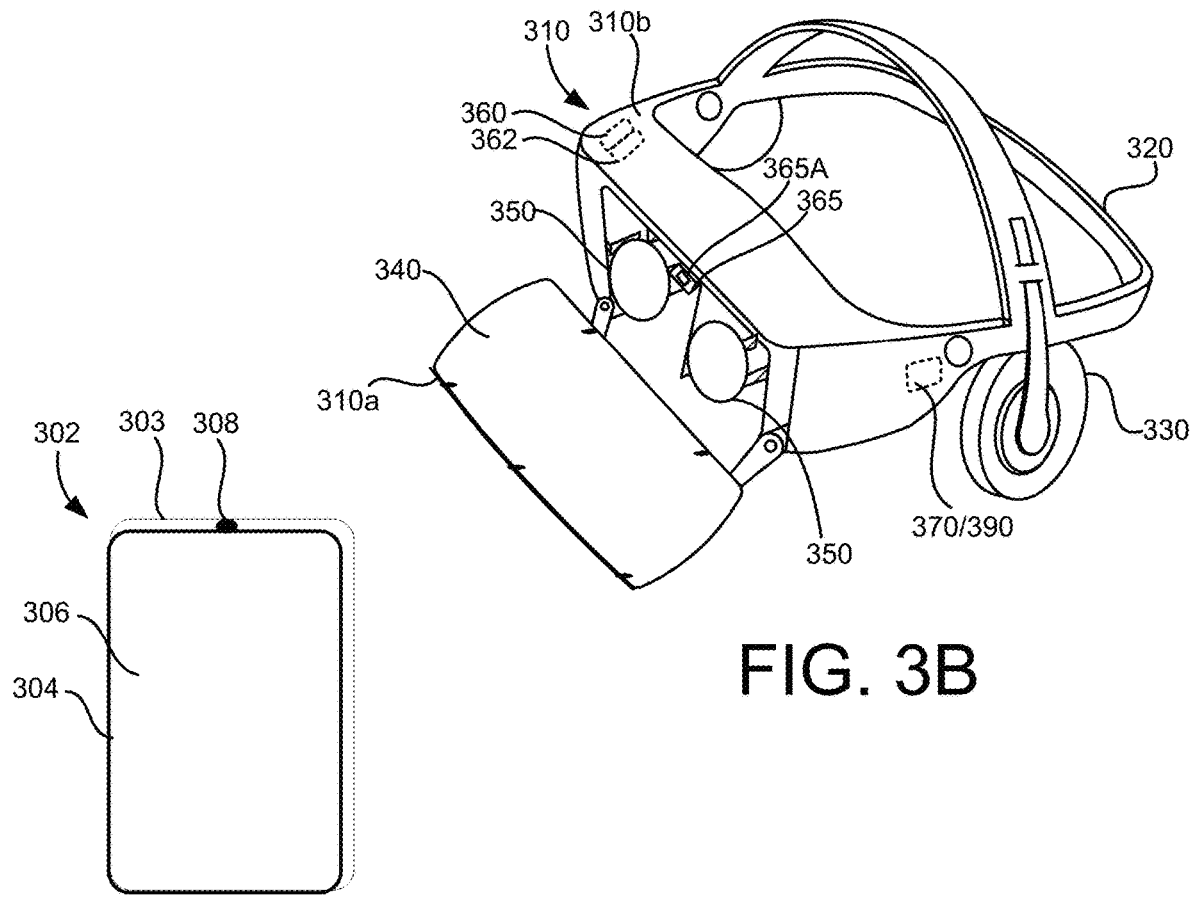
FIG. 3C
FIG. 3B

SMOOTHLY VARYING FOVEATED RENDERING

CROSS-REFERENCE TO RELATED APPLICATION

This application claims priority to U.S. application Ser. No. 62/515,124, filed on Jun. 5, 2017, the disclosure of which is incorporated herein by reference in its entirety.

BACKGROUND

A virtual reality (VR) system generates an immersive virtual environment for a user. For example, the immersive environment can be three-dimensional (3D) and can include multiple virtual objects with which the user may interact. An augmented reality (AR) system generates an augmented environment for a user. For example, the augmented environment can be generated by superimposing computer-generated images on a user's field of view of the real world.

The user can experience the immersive virtual environment or augmented environment via various display devices such as, for example, a helmet or other head mounted device including a display, glasses, or goggles that a user looks through when viewing a display device.

SUMMARY

This document relates, generally, to foveated rendering. In some implementations, the foveated rendering is smoothly varying.

One aspect is a method comprising warping a 3D scene based on a fixation point. The method also includes rendering the warped 3D scene to generate a first image, and unwarping the first image to generate a second image.

Another aspect is a system comprising at least one processor; and memory storing instructions. When the instructions are executed by the at least one processor, the instructions cause the system to warp a 3D scene based on a fixation point, render the warped 3D scene to generate a first image, and unwarp the first image to generate a second image.

Another aspect is a non-transitory computer-readable storage medium comprising instructions stored thereon. When the instructions are executed by at least one processor, the instructions cause a computing system to at least determine a pupil location of a wearer of a head-mounted display device and determine a fixation point based on the pupil location. The instructions also cause the computing system to warp a 3D scene based on the fixation point and render the warped 3D scene to generate a first image. The instructions also cause the computing system to unwarp the first image to generate a second image and cause the head-mounted display device to display the second image.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Figure 1:
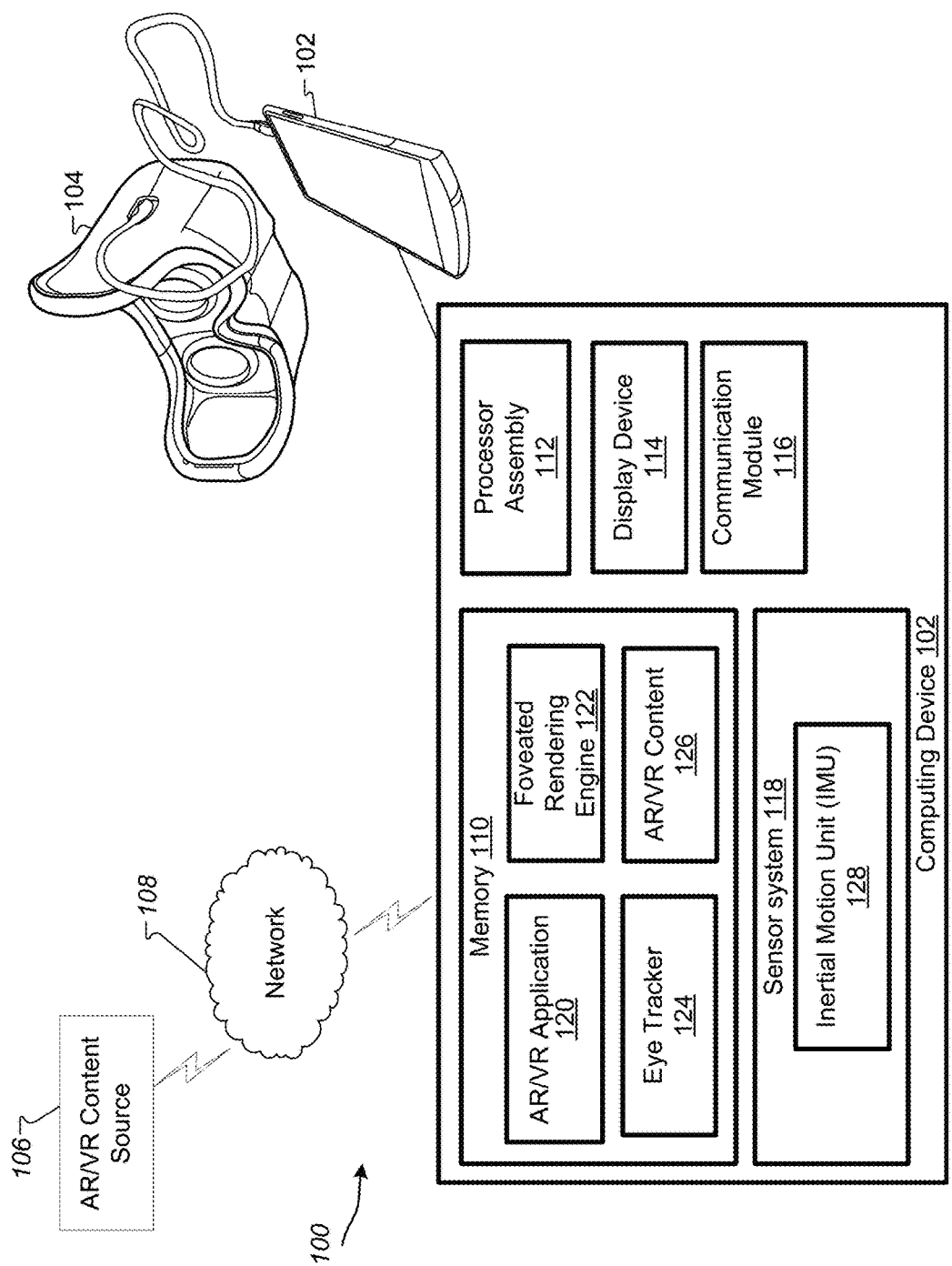
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

At least some implementations of VR systems and AR systems include a head-mounted display device (HMD) that can be worn by a user. In at least some implementations, the HMD includes a stereoscopic display in which different images and/or videos are shown to each of the user's eyes to convey depth. The HMD may display images that cover some (e.g., AR) or all (e.g., VR) of a user's field of view. The HMD may also track the movement of the user's head and/or pupil location. As the user's head moves, the HMD may display updated images that correspond to the user's changing orientation and/or position within the AR or VR environment.

The HMD may display images and/or videos generated by a rendering engine. The rendering engine may be a component of the HMD or may be a component of another computing device that transmits the rendered images to the HMD. Rendering images for display in a VR or AR system can be very resource intensive.

To improve the visual experience on VR and AR systems, displays with higher resolution, higher acuity, and lower motion-to-photon latency are needed. Motion-to-photon latency refers to the time delay between detecting a motion and updating the immersive virtual environment or the augmented reality environment. All these elements require systems with higher processing power to render larger number of pixels at lower latency. Additionally, mobile VR and AR systems need to meet these requirements while minimizing energy use.

In order to generate a satisfactory VR or AR experience, the rendering engine may need to minimize motion-to-photon latency so that updates to the VR or AR environment happen in a manner that matches the user's movement. In fact, if the motion-to-photon latency is too high, a VR system may cause the user to feel motion sickness.

Some implementations include a foveated rendering engine that renders images with varying quality to roughly correspond to the user's visual acuity based on where the user is looking and/or the performance of a lens of the HMD. For example, images may be rendered at a higher quality at a fixation point and at gradually decreasing quality levels as distance from the fixation point increases. In some implementations, the HMD includes a pupil tracker that identifies the fixation point based on where the user is looking. This identified fixation point can be used to identify a central portion of the user's field of view in which the user will have greater visual acuity than in other portions of the user's field of view (e.g., within the user's peripheral field of vision).

The foveated rendering engine may generate an image that has a higher quality in parts of the image that are intended to be displayed within the central portion of the user's field of view and a lower quality in parts of the image that are intended to be displayed within a peripheral portion of the user's field of view. As an example, the lower quality rendering may be at a lower resolution than the higher quality rendering. Implementations of the foveated rendering engine exploit the fact that the acuity of the human visual system drops off dramatically as a function of eccentricity from the center of gaze. By rendering parts of the image at a lower quality, the foveated rendering engine can render the image more quickly, while using fewer processor cycles and energy. Because these lower quality portions are located away from the fixation point, the lower quality is unlikely to be noticeable to the user due to the user's lower visual acuity as distance from the fixation point increases.

In some implementations, the quality of the image varies smoothly from a higher quality at the identified fixation point to a lower quality in the peripheral regions of the image. Because the quality of the images generated by the foveated rendering engine varies smoothly, the images are free of visual artifacts such as a tunnel vision effect or perceivable borders or transitions between regions of different quality levels.

In some implementations, the foveated rendering engine generates foveated images and/or video from a three-dimensional (3D) scene by warping the scene using a nonlinear function of distance from the fixation point to generate a warped scene. In some implementations, warping the scene includes altering the scene in a non-uniform manner (i.e., such that not all portions of the scene are altered in the same way). In some implementations, warping the scene includes altering the distance between vertices in the 3D scene and a fixation point. In some implementations, warping the scene includes mapping the 3D scene to a compressed intermediary space. The compressed intermediary space may allocate more screen space to portions of the scene that are close to the fixation point and less screen space to portions of the scene that are further from the fixation point.

The nonlinear function may be a logarithmic function, an approximately logarithmic function, or the like. The 3D scene may include one or more objects represented as polygonal meshes that are defined by vertices and faces. For example, the rendering engine may calculate a distance from each vertex of the 3D scene to a line that is normal to the view plane and passes through the fixation point.

Although the examples herein use a function of distance to perform warping, other implementations use other types of functions. For example, some implementations use a warping function of vertical distance and/or horizontal distance from the fixation point. In this manner, the warping function can warp the scene to a different degree in the horizontal dimension versus the vertical dimensions. Additionally, some implementations include an asymmetrical warping function that warps by a different amount on one side of the fixation point than on the other side. For example, portions of the scene that are to the left of the fixation point of the right eye may be warped more significantly than portions to the right of the fixation point as much of the portions of the scene to the left of the fixation point may be occluded by the user's nose and vice versa.

After the 3D scene is warped, the rendering engine can render and discretize the warped scene using various rendering techniques to generate a warped image. For example, standard graphics processor unit (GPU) operation can be used to render the image from the warped scene. The warped image can be rendered at a reduced resolution (e.g., having fewer pixels) as compared to the desired final image. Rendering each of the pixels may involve the GPU performing various operations that are computationally expensive, such as calculating lighting and texture values using GPU shaders. Since the time to render an image is a function of the number of pixels being rendered, the warped image will require less time to render than the desired final image would. For example, the warped image may have approximately half the number of pixels in the vertical and horizontal directions as the desired final image, resulting in the warped image having a fourth of the pixels as the desired final image. This four-fold reduction in the number of pixels can lead to a reduction in the rendering time for the warped image by a factor of four. Even greater improvements are possible in images with extra wide fields of view.

In some implementations, the warped image is then unwarped to generate the desired final image. For example, unwarping the image may counteract the previously performed warping. In some implementations, unwarping the image includes applying an inverse of the function used to warp the 3D scene to the pixels of the image. For example, the inverse of the function may move the pixels representing portions of the 3D scene back to where those portions were before the warping.

The unwarping can be accomplished in a computationally inexpensive manner using GPU operations to determine values for the pixels in the final image based on the values of pixels at locations determined by the unwarping function in the warped image. The calculations required to unwarp the warped image are computationally inexpensive as compared to the pixel rendering computations that are avoided using this technique (e.g., unwarping the image to generate the desired final image uses fewer processor cycles than rendering each of the pixels of the desired final image). Since the warping function allocates more of the image space to vertices from the 3D scene that are close to the fixation point than to those that are more distance, more of the pixels in the warped image represent the portion of the 3D scene near the fixation point. In other words, the warped image samples the region surrounding the fixation point at a higher rate than regions further away from the fixation point. This variable sampling allows the desired final image to be reconstructed with higher resolution around the fixation point and lower resolution elsewhere.

In addition to unwarping the image as described above, other nonlinear operations can be applied to the images too. For example, a nonlinear lens distortion correction can be applied to generate the final image. In some implementations, the unwarping and at least one other nonlinear operation are combined into a single operation so that the multiple operations can be applied without requiring any additional per-pixel computations. In other words, by combining multiple nonlinear operations into a single operation, the number of operations applied to each pixel of the final image is reduced so the time to render the image and/or the number of processor cycles used to render the image are reduced.

Unless otherwise noted, the techniques described herein can be applied to generate foveated images and/or videos. The generated images and/or video can include computer-generated content, standard photographs and videos of real scenes, and combinations thereof. Furthermore, the techniques described herein can be applied to generate a series of images (or a video) for use in an AR or VR environment.

FIG. 1 is a block diagram illustrating a system 100 according to an example implementation. The system 100 generates an augmented reality (AR) environment or virtual reality (VR) environment for a user of the system 100. In some implementations, the system 100 includes a computing device 102, a head-mounted display device (HMD) 104, and an AR/VR content source 106. Also shown is a network 108 over which the computing device 102 may communicate with the AR/VR content source 106.

In some implementations, the computing device 102 is a mobile device (e.g., a smartphone) which may be configured to provide or output VR content to a user. The computing device 102 may include a memory 110, a processor assembly 112, a display device 114, a communication module 116, and a sensor system 118. The memory 110 may include an AR/VR application 120, a foveated rendering engine 122, an eye tracker 124, and AR/VR content 126. The computing device 102 may also include various user input components (not shown) such as a controller that communicates with the computing device 102 using a wireless communications protocol.

The memory 110 can include one or more non-transitory computer-readable storage media. The memory 110 may store instructions and data that are usable to generate an AR/VR environment for a user.

The processor assembly 112 includes one or more devices that are capable of executing instructions, such as instructions stored by the memory 110, to perform various tasks, such as image and video rendering. For example, the processor assembly 112 may include a central processing unit (CPU) and/or a graphics processor unit (GPU). For example, if a GPU is present, some video rendering tasks may be offloaded from the CPU to the GPU.

The display device 114 may, for example, include an LCD (liquid crystal display) screen, an OLED (organic light emitting diode) screen, a touchscreen, or any other screen or display for displaying images or information to a user. In some implementations, the display device 114 includes a light projector arranged to project light onto a portion of a user's eye.

The communication module 116 includes one or more devices for communicating with other computing devices, such as the AR/VR content source 106. The communication module 116 may communicate via wireless or wired networks.

The sensor system 118 may include various sensors, including an inertial motion unit (IMU) 128. Implementations of the sensor system 118 may also include different types of sensors, including, for example, a light sensor, an audio sensor, an image sensor, a distance and/or proximity sensor, a contact sensor such as a capacitive sensor, a timer, and/or other sensors and/or different combination(s) of sensors.

The IMU 128 detects motion, movement, and/or acceleration of the computing device 102 and/or the HMD 104. The IMU 128 may include various different types of sensors such as, for example, an accelerometer, a gyroscope, a magnetometer, and other such sensors. A position and orientation of the HMD 104 may be detected and tracked based on data provided by the sensors included in the IMU 128. The detected position and orientation of the HMD 104 may allow the system to in turn, detect and track the user's gaze direction and head movement.

The AR/VR application 120 may present or provide the AR/VR content to a user via one or more output devices of the computing device 102 such as the display device 114, a speaker(s) (not shown), and/or other output devices. In some implementations, the AR/VR application 120 includes instructions stored in the memory 110 that, when executed by the processor assembly 112, cause the processor assembly 112 to perform the operations described herein. For example, the AR/VR application 120 may generate and present an AR/VR environment to the user based on, for example, AR/VR content, such as the AR/VR content 126 and/or AR/VR content received from the AR/VR content source 106. The AR/VR content 126 may include 3D scenes that can be rendered as images or videos for display on the display device 114. For example, the 3D scene can include one or more objects represented as polygonal meshes. The polygonal meshes may be associated with various surface textures, such as colors and images. The 3D scene may also include other information such as, for example, light sources that are used in rendering the 3D scene.

The AR/VR application 120 may use the foveated rendering engine 122 to generate images for display on the display device 114 based on the AR/VR content 126. In some implementations, the foveated rendering engine 122 includes instructions stored in the memory 110 that, when executed by the processor assembly 112, cause the processor assembly 112 to perform the operations described herein. For example, the foveated rendering engine 122 may generate foveated images based on a 3D scene of the AR/VR content 126. The foveated images have a varying quality level to approximate the varying acuity of the visual system (i.e., the portion of the image that is expected to be perceived by the fovea of the user's eye has a higher quality level than portions of the image that are expected to be perceived by other regions of the user's eye). In at least some implementations, the foveated rendering engine 122 generates images that degrade in quality smoothly as a distance from a fixation point increases.

For example, the foveated images may be images generated by rendering the 3D scene with varying quality levels. The images may be two-dimensional (2D) (e.g., 2D arrays of pixels). In some implementations, the images are stereoscopic images the can be displayed by the HMD 104 to convey depth so that a wearer of the HMD perceives a 3D environment. For example, the stereoscopic image may include separate portions of the image for each eye. The portions may represent the same scene from slightly different perspectives (e.g., from the perspective of a left eye and a right eye).

Rendering the images may include determining a camera position and a viewport (or image plane) through which the 2D image of the 3D scene will be rendered. The viewport is like a window through which the 3D scene is viewed. The dimensions of the viewport correspond to the dimensions of the desired 2D image and each pixel of the 2D image can be mapped to a position on the viewport. The color value of each pixel may then be determined based on what would be seen by the camera at the corresponding position of the viewport.

Based on the position of the camera and the viewport, the 3D scene can be projected into screen space coordinates (e.g., 2D coordinates that correspond to vertical and horizontal positions within the image). For example, each entity (or portion of an entity such as a vertex) in the 3D scene may be mapped to a specific position on the viewport based on the intersection between a line segment that extends from the entity to the camera and the viewport. For some 3D scenes, portions of the scene may not intersect with the viewport. These portions would not be part of the rendered 2D image. In a stereoscopic image, the viewport and camera positions may be slightly different for a left-eye image portion than for a right-eye image portion.

The foveated images may include at least one fixation point. The fixation point may be a point in the image that has a higher quality level than other portions of the image. For example, the higher quality level portions may be rendered at a higher resolution than the lower quality level portions. In some implementations, the fixation point is a screen space coordinate within the image. In some implementations, the fixation point is a screen space coordinate within the image that is determined based on the direction a user is looking. In some implementations, the fixation point is a screen space coordinate within the image that is determined based on properties of a lens through which a user looks. In some implementations, the fixation point is a 3D coordinate within a 3D scene. In these implementations, the fixation point may be projected into screen space coordinates.

In at least some implementations, the foveated rendering engine 122 determines a fixation point at which the user is looking based, at least in part, on the eye tracker 124. In some implementations, the eye tracker 124 includes instructions stored in the memory 110 that, when executed by the processor assembly 112, cause the processor assembly 112 to perform the operations described herein. For example, the eye tracker 124 may determine a location on the display device 114 at which the user's gaze is directed. The eye tracker 124 may make this determination based on identifying and tracking the location of the user's pupils in images captured by an imaging device of the sensor system 118.

The AR/VR application 120 may update the AR/VR environment based on input received from the IMU 128 and/or other components of the sensor system 118. For example, the IMU 128 may detect motion, movement, and/or acceleration of the computing device 102 and/or the display device 114. The IMU 128 may include various different types of sensors such as, for example, an accelerometer, a gyroscope, a magnetometer, and other such sensors. A position and orientation of the HMD 104 may be detected and tracked based on data provided by the sensors included in the IMU 128. The detected position and orientation of the HMD 104 may allow the system to in turn, detect and track the user's gaze direction and head movement. Based on the detected gaze direction and head movement, the AR/VR application 120 may update the AR/VR environment to reflect a changed orientation and/or position of the user within the environment.

Although the computing device 102 and the HMD 104 are shown as separate devices in FIG. 1, in some implementations, the computing device 102 may include the HMD 104.

In some implementations, the computing device 102 communicates with the HMD 104 via a cable, as shown in FIG. 1. For example, the computing device 102 may transmit audio and video signals to the HMD 104 for display for the user, and the HMD 104 may transmit motion, position, and/or orientation information to the computing device 102. In some implementations, the HMD 104 includes a chamber in which the computing device 102 may be placed. In some implementations, the user is able to view the display device 114 of the computing device 102 while wearing the HMD 104 (e.g., through lenses or apertures within the HMD 104). For example, the computing device 102 and the HMD 104 can together function as a stereoscopic viewer by partitioning a screen of the display device 114 into a first image that is viewable by only the left eye of the user when viewed through the HMD and a second image that is viewable by only the right eye of the user when viewed through the HMD.

The AR/VR content source 106 may generate and output AR/VR content, which may be distributed or sent to one or more computing devices, such as the computing device 102, via the network 108. In an example implementation, the AR/VR content includes three-dimensional scenes and/or images. Additionally, the AR/VR content may include audio/video signals that are streamed or distributed to one or more computing devices. The AR/VR content may also include an AR/VR application that runs on the computing device 102 to generate 3D scenes, audio signals, and/or video signals. According to an illustrative example implementation, virtual reality (VR), which may also be referred to as immersive multimedia or computer-simulated life, may, at least in some cases, replicate or simulate, to varying degrees, an environment or physical presence in places in the real world or imagined worlds or environments. Augmented reality (AR) may, at least in some cases, overlay computer generated images on a user's field of view of the real world.

The network 108 may be the Internet, a local area network (LAN), a wireless local area network (WLAN), and/or any other network. A computing device 102, for example, may receive the audio/video signals, which may be provided as part of VR content in an illustrative example implementation.

Figure 2:
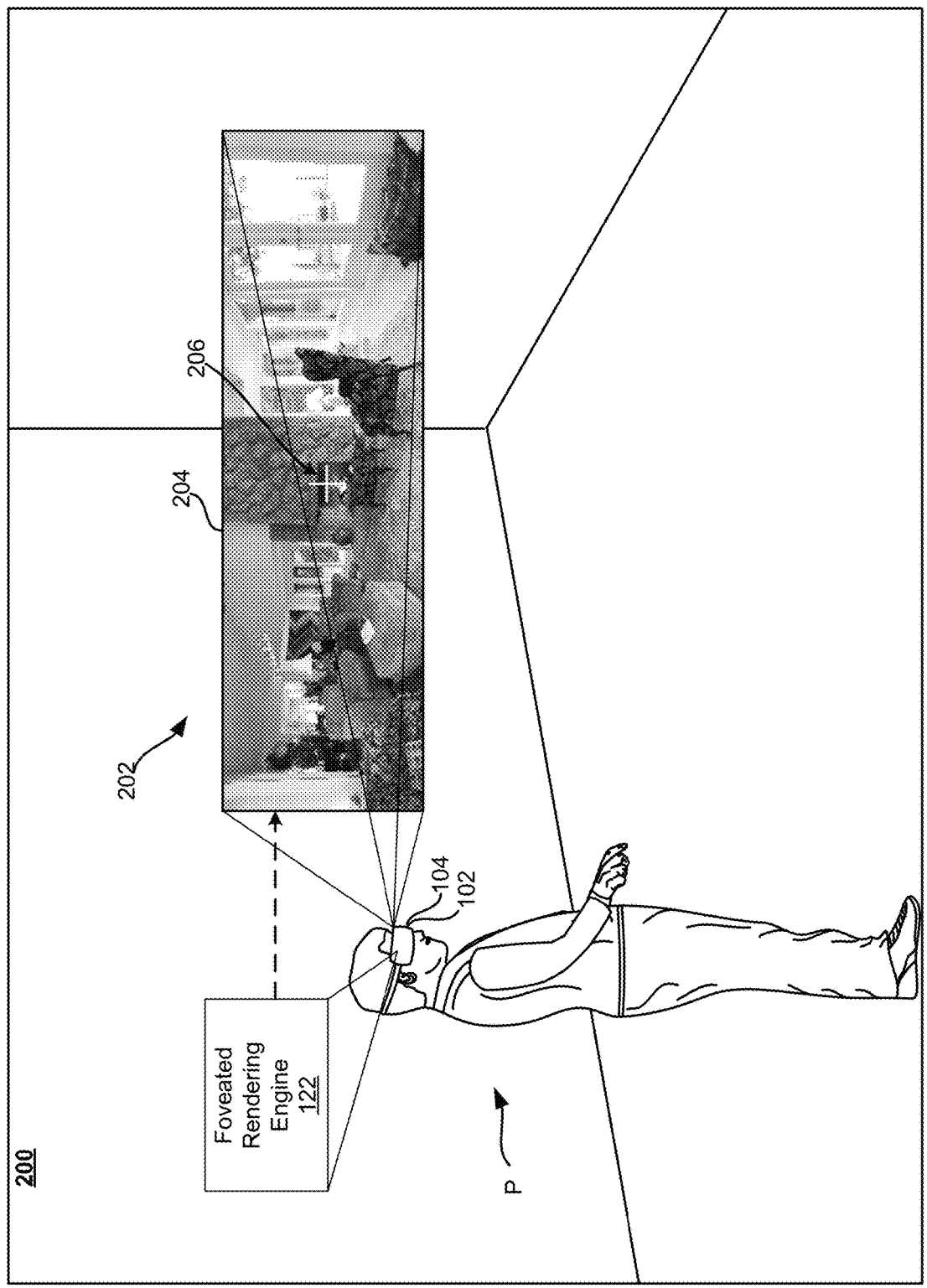
FIG. 2 is an example implementation of an augmented and/or virtual reality system including a head mounted display with smoothly varying foveated rendering, in accordance with implementations as described herein.

FIG. 2 is a third-person view of a physical space 200, in which a person P is experiencing a VR environment 202 through the HMD 104. In this example, the computing device 102 is disposed within the HMD 104 so that the user can see the display device 114 while wearing the HMD 104. The VR environment 202 is generated by the computing device 102 and displayed on the display device 114 of the computing device 102.

The VR environment includes foveated frames, such as the frame 204, that are generated by the foveated rendering engine 122. The foveated frames have a quality level that gradually decreases as a distance from a fixation point 206 increases. As can be seen in the frame 204, the image quality is higher near the fixation point 206 than the image quality further away from the fixation point (e.g., near the edges of the frame 204). Because parts of the foveated frames are rendered at lower quality levels, rendering the foveated frames requires less processor cycles than would be required to render the frames entirely at a higher quality level. Additionally, because the regions of the foveated frames that are rendered at lower quality levels are intended to be displayed in the person's peripheral vision, the person is unlikely to notice the reduced quality. Furthermore, because the quality degrades smoothly, the foveated frames, such as the foveated frame 204, are free of border artifacts or other artifacts as the quality levels varies.

FIGS. 3A and 3B are perspective views of an example HMD 300, such as, for example, the HMD 104 worn by the user in FIG. 2, and FIG. 3C illustrates an example handheld electronic device 302 that is usable with the HMD 300.

The handheld electronic device 302 may include a housing 303 in which internal components of the handheld electronic device 302 are received, and a user interface 304 on an outside of the housing 303 that is accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. In some implementations, the display 340 is a display device from a computing device, such as the computing device 102 of FIG. 1, that is inserted and secured between the front portion 310a and the base portion 310b.

Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical environment relative to the immersive environment, and/or may be displayed to the user on the display 340 in a pass-through mode, allowing the generation of an augmented reality environment that includes a combination of images from the real world and computer generated imagery. In some implementations, the pass-through mode is used to allow the user to temporarily leave the immersive environment and return to the physical environment without removing the HMD 300 or otherwise change the configuration of the HMD 300 to move the housing 310 out of the line of sight of the user.

In some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to in turn, detect and track the user's head gaze direction and movement.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes or a specific portion of the user's eyes, such as the pupil, to detect and track direction and movement of the user's gaze. In some implementations, the HMD 300 may be configured so that the detected gaze is processed as a user input to be translated into a corresponding interaction in the AR experience or the immersive VR experience. In some implementations, the HMD 300 is configured to use the detected gaze of the user to determine a fixation point for use in foveated rendering of the AR or VR environment.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., LCD (liquid crystal display), an OLED (organic light emitting diode) display, or another type of display) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 4:
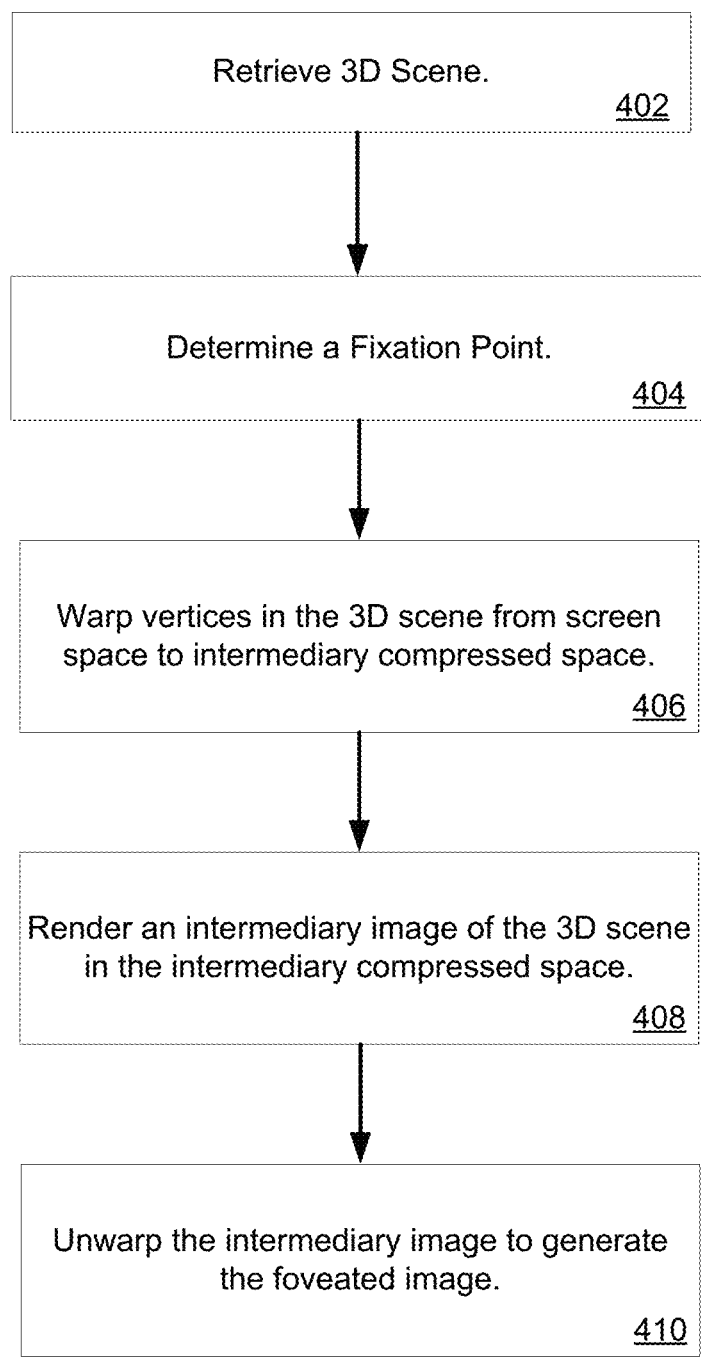
FIG. 4 is a flowchart of an example method 400 of rendering a smoothly varying foveated image, in accordance with implementations as described herein.

A method 400 of rendering a smoothly varying foveated image, in accordance with implementations as described herein, is shown in FIG. 4. The method 400 may be performed by implementations of the foveated rendering engine 122.

At operation 402, a 3D scene is retrieved. As described above, the 3D scene may include multiple objects, including meshes and light sources. The meshes may be formed from polygonal faces, such as triangles, that are defined by vertices. Each of the vertices may, for example, have an X, Y, and Z coordinate in a three-dimensional space. A face can be defined by three, or in some implementations more co-planar vertices. A mesh can be defined by multiple faces, at least some of which may share vertices.

The 3D scene may be retrieved from local memory or may be retrieved from another computing device, such as the AR/VR content source 106. Upon retrieving the 3D scene, the surfaces of at least some of the surfaces of the meshes may be tessellated. For example, larger mesh surfaces (e.g., surfaces in a mesh that have a surface area greater than a predetermined threshold value) may be tessellated to divide the surface into multiple smaller. The tessellation will introduce additional vertices and shorter edges on the faces. Because the warping operation may bend straight lines into curved lines, visual artifacts may be introduced if the edges are too long. By tessellating any larger surfaces, the bending of the edges becomes insignificant. Additionally, in some implementation, tessellation is performed by a GPU using a tessellation shader or geometry shader.

In some implementations, per pixel error correction can be applied to address distortion introduced by triangle edges being warped. For example, an error value can be computed during the foveated rendering and stored in the alpha channel of the output pixel value. The error value can be calculated by comparing an interpolated position of a vector to a value generated by a per-pixel computation. Then, during the generation of a final image, the error correction can be applied.

At operation 404, a fixation point is determined. In some implementations, the fixation point is determined using gaze tracking technology, such as the eye tracker 124. As the user's eyes move around a field view, the fixation point will move correspondingly. In some implementations, the fixation point is determined based on the lens of the HMD 104. For example, the fixation point may be the point where the lens provides the highest acuity. In some implementations, the fixation point corresponds to a portion of the lens having higher acuity than other portions of the lens. For example, the fixation point may be selected as a midpoint of portion of the lens that has higher acuity than 90% of the lens, 95% of the lens, or 99% of the lens. In some implementations, separate fixation points are identified for each of the user's eyes.

At operation 406, the vertices in the 3D scene are warped from the screen space to the intermediary compressed space. In some implementations, warping the vertices includes transforming the coordinates of the vertices from the screen space to a compressed space using a nonlinear function. In some implementations, this warping has an effect similar to applying a fish-eye lens. In at least some implementations, the warping function is applied by a GPU vertex shader.

In at least some implementations, the warping is performed by projecting each vertex to a screen coordinate, which may be defined by X and Y screen coordinate values between −1 and 1. The projected coordinates are then recalculated relative to a screen coordinate system that has the fixation point as an origin. The projected coordinates are scaled so that they continue to have coordinate values between −1 and 1. Then, the projected coordinates are transformed according to a nonlinear warping (transformation) function. The transformed coordinate values are then recalculated in terms of the center of the screen (i.e., as opposed to the fixation point) and rescaled to have values between −1 and 1. Then, the vertex is re-projected into the 3D scene.

As a non-limiting example, consider the triangle described (post viewing transformation) by homogeneous coordinate vertices (0, 0.6, 1, 2), (−0.6, 0, 1, 2), (0.6, 0, 1, 2) The 2D screen coordinates are (0, 0.3), (−0.3, 0), (0.3, 0). Let the fixation point be (0.1, 0). (For simplicity the fixation point has been placed on the x-axis so no remapping of the y coordinates is required in this example.) The x-interval [−1, 0.1] is remapped to [−1, 0] and [0.1, 1] is remapped to [0, 1]. Hence the remapped vertices are ((0−0.1)/1.1, (−0.3−0.0)/1), ((−0.3−0.1)/0.9, (0−0)/1), ((0.3−0.1)/0.9, (0−0)/1). Simplified these are: (−0.09, 0.3), (−0.36, 0), (0.22, 0). Using, for example, $\sqrt{d}$ for t(d) (the transformation function) these become (−0.3, 0.55), (−0.6, 0), (0.47, 0). These vertices are again remapped into the coordinate system with its origin at the image centre: ((−0.30+0.1)*1.1, (0.55+0)*1), ((−0.6+0.1)*1.1, (0+0)*1), ((0.47+0.1)*0.9, (0+0)*1) or (−0.22, 0.55), (−0.55, 0), (0.51, 0). Finally, these vertices are then projected back to 3D homogeneous coordinates as (−0.44, 1.1, 1, 2), (−1.11, 0, 1, 2), (1.03, 0, 1, 2).

Figure 5:
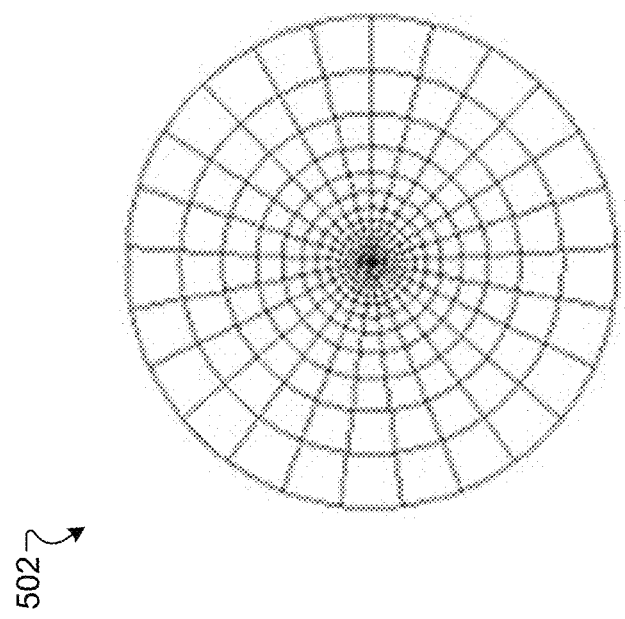
FIGS. 5A and 5B are schematic diagrams that illustrate how example warping functions sample an image, in accordance with implementations as described herein.

FIGS. 5A and 5B are schematic diagrams that illustrate how example warping functions sample an image. In FIG. 5A, the overlay 500 includes multiple circles. Each of the circles represents a region of an underlying image space (not shown) that would be sampled to generate a warped image. The overlay 500 would be centered over the fixation point in a scene. As can be seen in FIG. 5A, the circles are smaller close to the center of the overlay 500, and so the region of the underlying image space used to generate a pixel is also smaller. The circles in the overlay 500 that are further from the center (fixation point) become larger so more pixels from the underlying image are sampled to generate a single pixel in the warped image. The overlay 502 of FIG. 5B is similar to the overlay 500, except that the overlay 500 includes square-like regions rather than circles. Again, the regions further away from the fixation point are larger and thus more pixels are sampled to generate a single pixel in these further regions.

In some implementations, a vertex is projected onto the screen space and a difference from the X-coordinate and the Y-coordinate of the projected vertex to an X-coordinate and a Y-coordinate of a fixation point is determined. In the examples herein, the difference between the projected X-coordinate of the vertex and the X-coordinate of the fixation point is referred to as X'. Similarly, the difference between the projected Y-coordinate of the vertex and the Y-coordinate of the fixation point is referred to as Y'. One example of a nonlinear warping function used in some implementations is a log-polar mapping. For a given X-delta, Y-delta, its coordinate is the warped representation is ($\rho$, $\theta$) where:

$$\rho = \log(\sqrt{X'^2 + Y'^2}); \text{ and}$$

$$\theta = a\tan(Y'/X')$$

Figure 6:
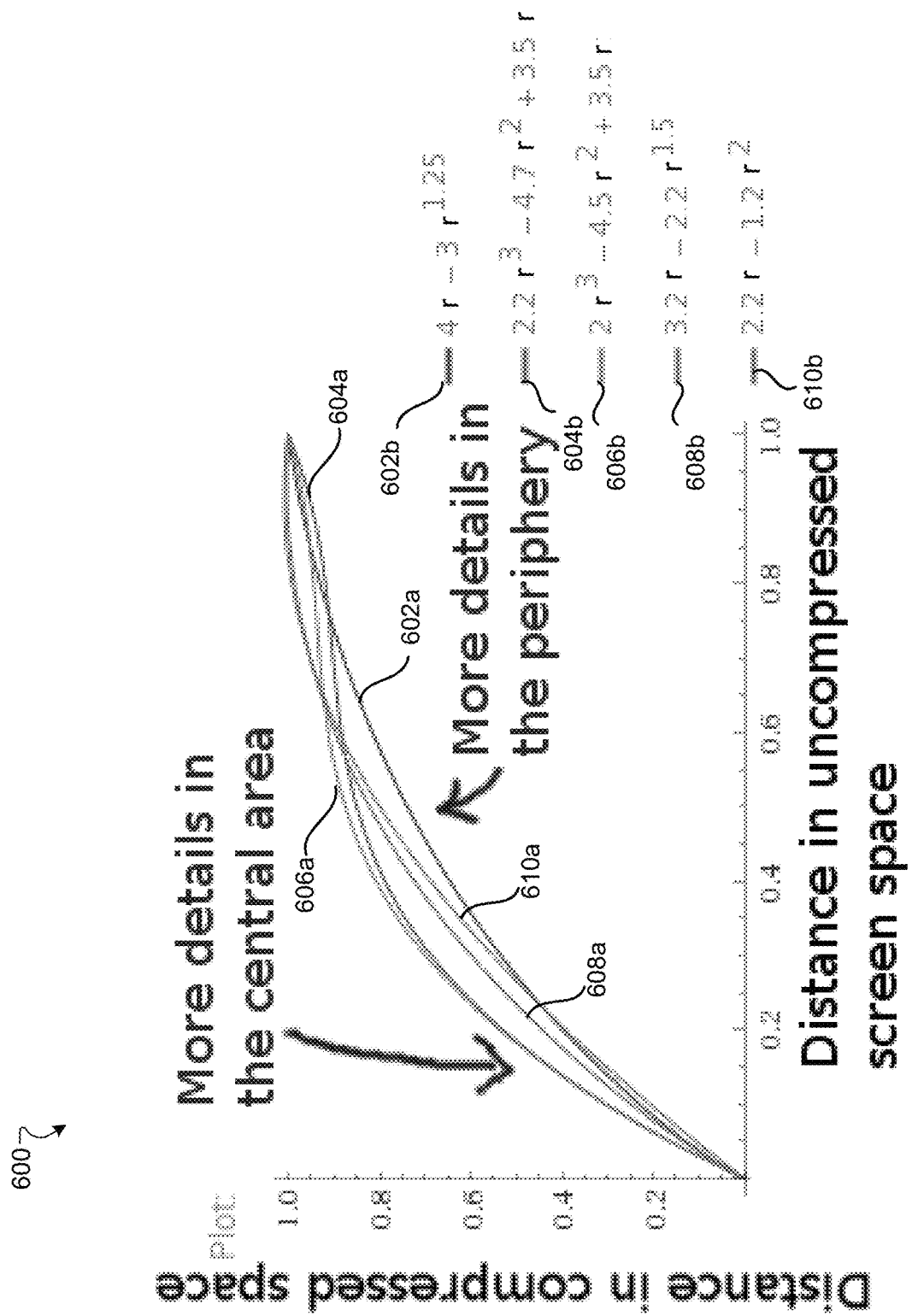
FIG. 6 is a graph with plots for several example warping functions, in accordance with implementations as described herein.

In this example, the log-polar mapping is continuous and does not include any data reduction. The data reduction is a result of finitely sampling the intermediary (warped) representation. Other warping functions may be used as well. In some implementations, the warping function is a nonlinear transformation that is a function of the radial distance between the projected vertex and the fixation point. FIG. 6 shows a graph 600 that shows plots for several example warping functions. The plots illustrate the mappings performed by each of the example warping functions. The X-axis of the graph 600 is distance from the fixation point in uncompressed space and the Y-axis of the graph 600 is distance from the fixation point in compressed (warped) space. The graph 600 includes plot 602*a*, plot 604*a*, plot 606*a*, plot 608*a*, and plot 610*a*. The plot 602*a* represents the function 602*b*. The plot 604*a* represents the function 604*b*. The plot 606*a* represents the function 606*b*. The plot 608*a* represents the function 608*b*. The plot 610*a* represents the function 610*b*.

Each of the plots represents a function on the distance from the fixation point, which is represented as r. For a specific vertex, r can be calculated using the following equation:

$$r = \sqrt{X'^2 + Y'^2}$$

In some implementations, the distance r is a projected distance between the position of the vertex after projection into screen space and the fixation point (in screen space).

Where the slopes of the plots are greater than 45 degrees, the uncompressed screen space is expanded in the compressed space. These regions will be rendered with higher resolution in the final image. Where the slopes of the plots are less than 45 degrees, the uncompressed screen space is reduced in the compressed space. These regions will be rendered with lower resolution in the final image. The plots and warping functions shown in FIG. 6 are examples. Other warping functions may be used in some implementations. For example, some implementations use various second-degree polynomials or third-degree polynomials of distance from the fixation point (r) as warping functions. Additionally, some implementations, use a logarithmic warping function, such as log(r+1), or a radical warping function, such as $\sqrt{r}$.

Additionally, some implementations include warping functions of distance from the fixation point in X (X') and distance from the fixation point in Y (Y'), rather that distance (r). In these examples, the warping can be performed differently in the vertical dimension than in the horizontal dimension. Additionally, some implementations include asymmetric warping functions. For example, asymmetric warping functions can be used to warp vertices above the fixation point differently than vertices that are below the fixation point. Additionally, asymmetric warping functions can be used to warp vertices to the left of the fixation point differently than vertices that are to the right of the fixation point (e.g., to more heavily warp regions that are likely to be occluded by the user's nose and thus preserve more resolution for the other areas of the field of view).

Returning now to FIG. 4, an intermediary image is rendered based on the warped vertices at operation 408. In some implementations, the intermediary image is rendered at a resolution that is lower than the resolution of the desired final image. In some implementations, a pixel shader of the GPU renders the surfaces (e.g., triangles) of the meshes in the compressed (warped) space. Depending on the 3D scene, rendering the image may include applying an image as a texture map to at least some of the surfaces. The image may be rendered using multi-sample anti-aliasing (MSAA). For example, some implementations render images using 4× MSAA or 8× MSAA. Because the MSAA is performed on the compressed (warped) image, the processor cycles required for performing MSAA are less than would be required to perform MSAA on each of the pixels from the final image. The MSAA is performed by a GPU in some implementations.

In some implementations, the intermediary (warped) image has approximately one quarter of the number of pixels as the desired final image. For example, the intermediary image may have half as many pixels as the desired final image in the vertical dimension and half as many pixels as the desired final image in the horizontal dimension, resulting in one fourth as many pixels as the desired final image. Because the number of pixels being rendered is reduced, rendering the intermediary image will require less time and/or processor cycles. In this example, rendering the intermediary image would require approximately one fourth of the time and/or processor cycles required to render the full sized final image.

In some implementations, other ratios of the number of pixels in the intermediary image with respect to the number of pixels in the full-sized final image are used. For example, when the full-sized final image has a wider aspect ratio, an even larger reduction in the number of pixels may be possible since a larger portion of the full-sized final image will be in the user's peripheral vision and can be rendered at a lower quality level. In some implementations, various factors are used to select a resolution for the intermediary image, including the desired resolution of the final image, the aspect ratio of the final image, whether an eye tracker is available to determine the fixation point, the acuity profile of the lens in the HMD, and the warping function that is used in operation 406.

Figure 7A:
FIG. 7A is an example intermediary image of a warped scene, in accordance with implementations as described herein.
Figure 7B:
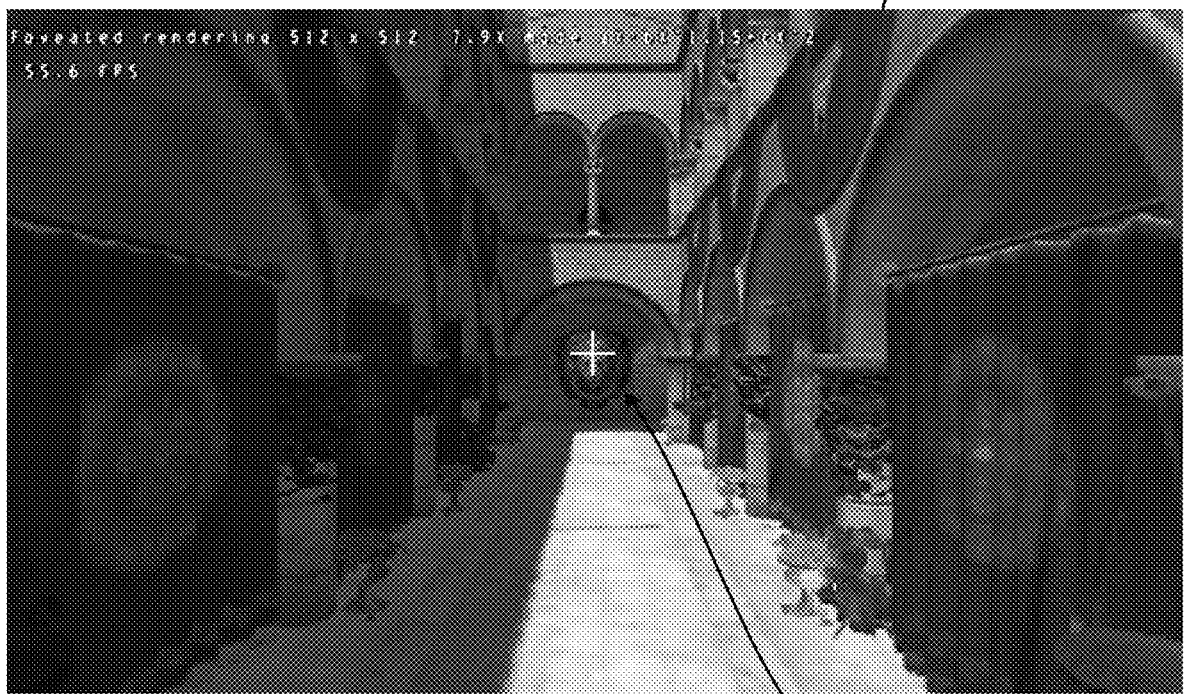
FIG. 7B is an image of an unwarped scene that corresponds to the image of FIG. 7B.

FIG. 7A shows an example of an intermediary (warped) image 700. FIG. 7B shows the corresponding scene without warping in image 702. FIG. 7B also includes a fixation point 704 that is to warp the intermediary image 700. As can be seen in FIG. 7A, the portions of the scene near the fixation point (e.g., the lion head) are warped to occupy a larger portion of the intermediary image 700 (i.e., are rendered with more pixels/higher resolution) and the portions of the scene that are farther away from the fixation point (e.g., the curtains) are warped to occupy less of the image (i.e., are rendered with fewer pixels/lower resolution).

Returning now to FIG. 4, at operation 410, the intermediary image is unwarped to generate the final, foveated image. In some implementations, a pixel value for each of the pixels in the final, foveated image can be identified at a corresponding location in the intermediary image. For example, the same warping function used in operation 406 can be applied to a pixel location in the final, foveated image to identify the corresponding location for the pixel value in the intermediate image. In some implementations, a pixel shader of the GPU performs this warping function to retrieve the pixel value from the intermediary image as the final, foveated image is rendered. In some implementations, bilinear filtering is used within the foveal region during the unwarping.

Implementations of the method 400 can be used to perform foveated video rendering in real-time using a standard GPU on a laptop computer. This real-time performance allows for generation of responsive AR and/or VR environments.

In some implementations, when rendering video, temporal anti-aliasing is used in at least the periphery regions of the final images (e.g., regions that are more distant from the fixation point). For example, a method of temporal anti-aliasing is to use alpha blending with the previous frame. In some implementations, the level of transparency between the current frame and the previous frame is varied according to the amount of movement of the camera, to have a smoother anti-aliasing when there is no movement, and a shorter temporal fading when the camera is moving.

Figure 8:
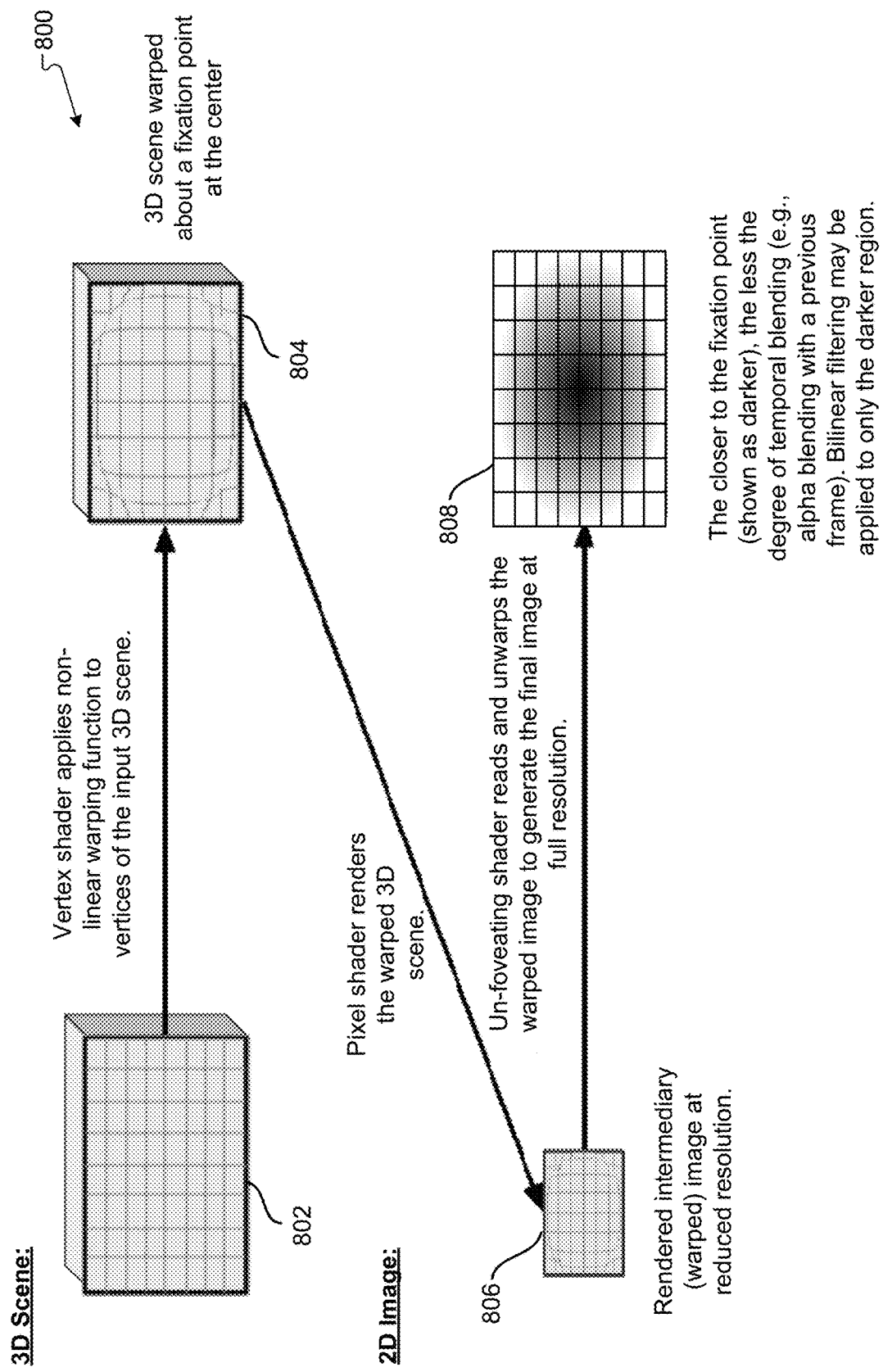
FIG. 8 is a schematic diagram of a foveated rendering process according to some implementations.

FIG. 8 is a schematic diagram of an example foveated rendering process 800 according to some implementations. The process 800 may be performed by, for example, the foveated rendering engine 122 to generate images or video for an AR or VR environment. One of the inputs to the process is an input 3D scene 802. In some implementations, a shader of a GPU, such as a vertex shader, a geometry shader, or a fragment shader, applies a nonlinear warping function to the vertices of the input 3D scene 802 to generate a warped 3D scene 804 that is warped about a fixation point (shown at the center of the image in this example). In some implementations, a pixel shader renders the warped 3D scene 804 at a reduced resolution to generate the intermediary (warped) image 806. In some implementations, an un-foveating shader (e.g., a pixel shader of a GPU configured to perform the mapping described herein) reads and unwarps the intermediary image 806 to generate the final image 808 at full resolution. In some implementations, when generating video, temporal blending is used to blend the regions that are more distant from the fixation point with previous frames. Additionally, in some implementations, bilinear filtering is used to generate portions of the final image 808 that are nearer to the fixation point.

Figure 9:
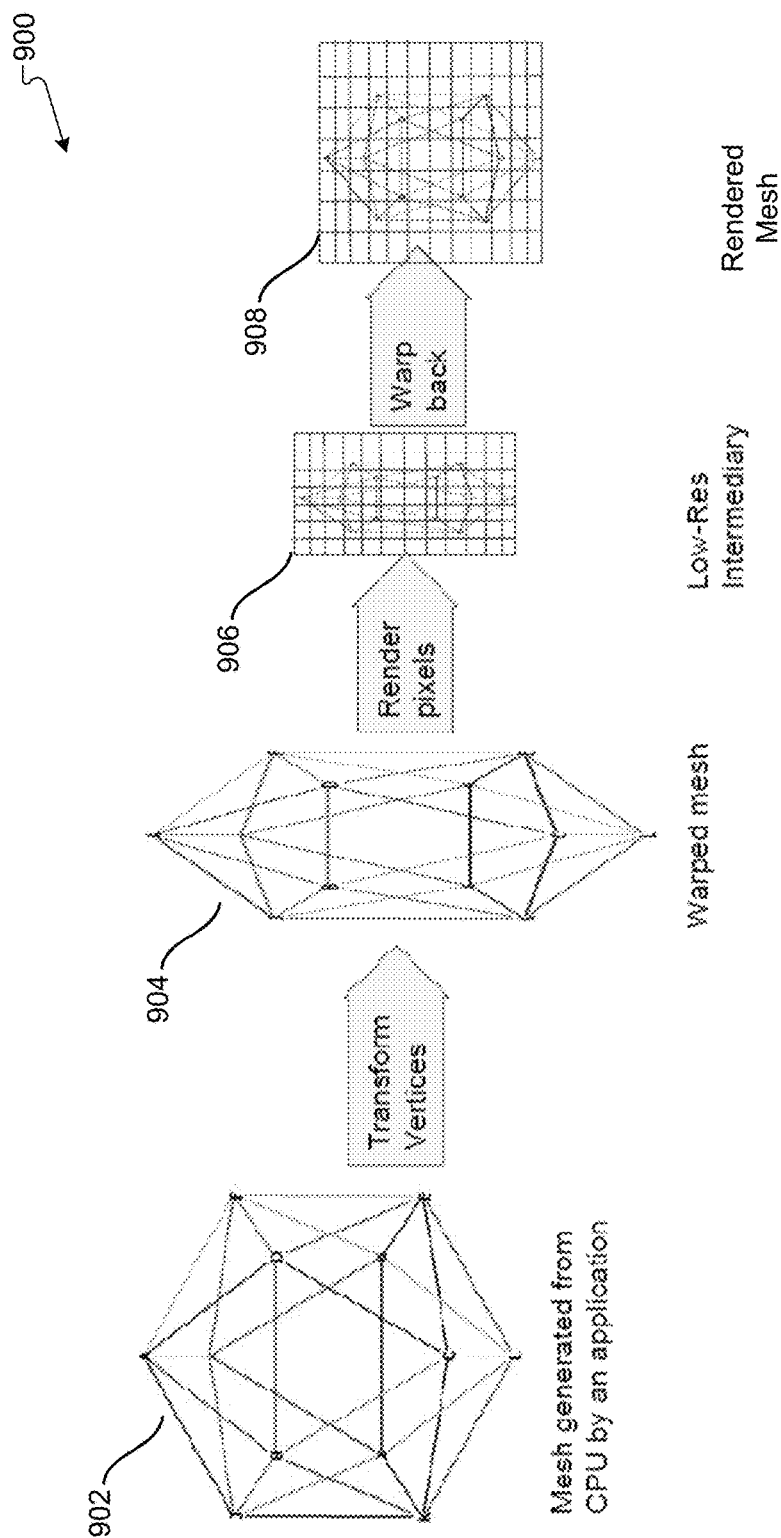
FIG. 9 is a schematic diagram of a foveated rendering process according to some implementations.

FIG. 9 is a schematic diagram of an example foveated rendering process 900 according to some implementations. The process 900 may be performed by, for example, the foveated rendering engine 122 to generate images or video for an AR or VR environment. One of the inputs to the process is an input 3D mesh 902. The mesh 902 may be a component of a 3D scene generated by an application, such as the AR/VR application 120. The vertices of the mesh 902 are transformed to warp the mesh and generate the warped mesh 904. For example, the vertices of the mesh 902 may be warped by applying a nonlinear warping function that is based on distances of the vertices from a fixation point determined based on the user's gaze. The warped mesh 904 is then rendered to generate a lower resolution intermediary image 906. The intermediary image is then warped back (un-warped) to generate the final image 908 of the rendered mesh.

Although many of the examples above relate to rendering computer-generated images/videos from three-dimensional scenes, in some implementations the techniques and systems described herein are used to render foveated versions of standard photographs and videos of real scenes. The image can either be rendered using a pixel shader that will compute for each pixel of the foveated image the original position in the source image, if the image/video will cover the entire screen; or if the images/video will be integrated in a 3D scene, the mesh warping processes can be used with the image/video used as a texture for the mesh. To render a dynamic image or video, some implementations use a buffer to cache the image/video data (e.g., from a remote source or hard drive). The buffer allows smooth rendering as the image/video data can be quickly retrieved from the buffer without the delays associated with accessing a hard drive or receiving data from a remote source.

Figure 10:
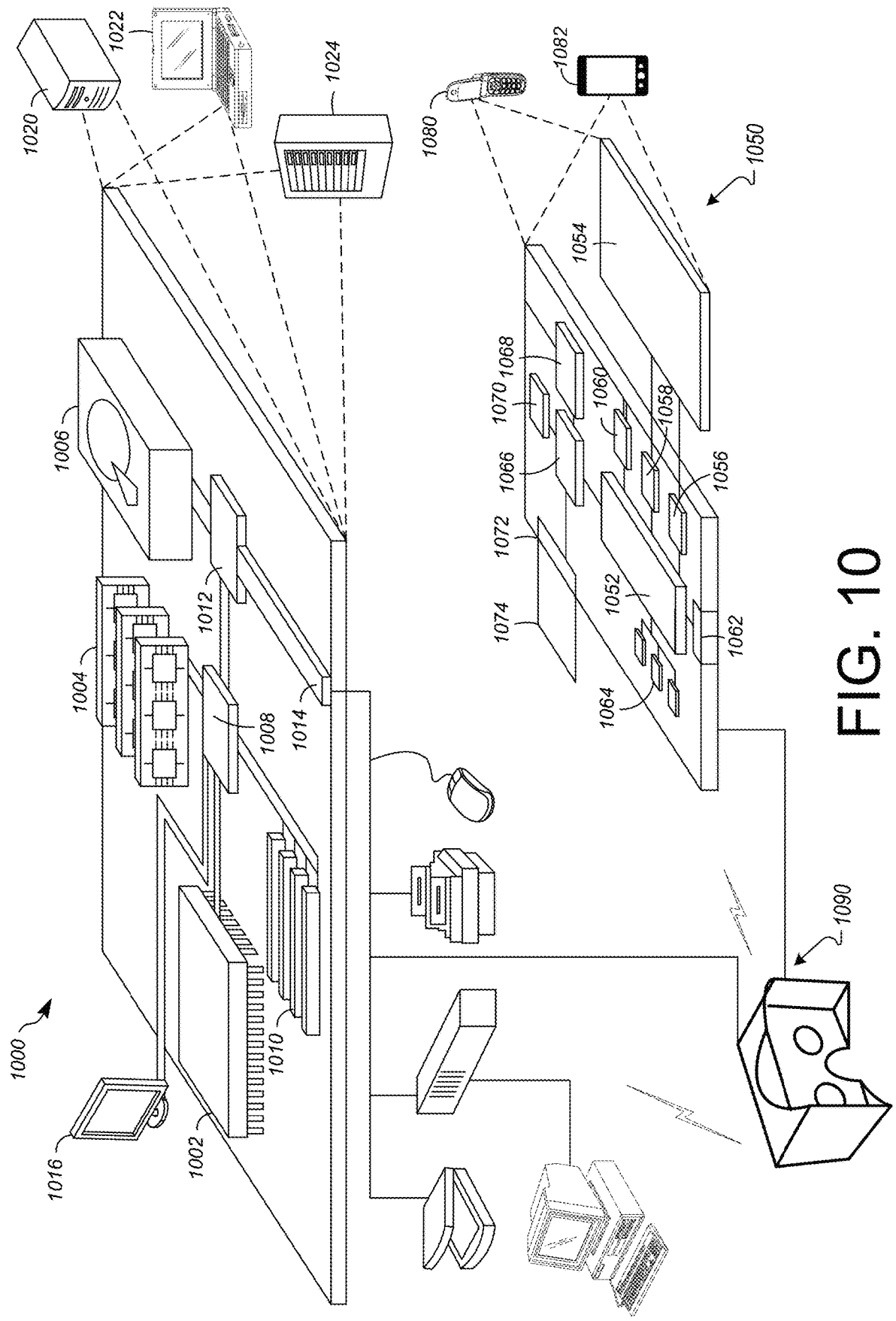
FIG. 10 is an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1020 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1020, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1020. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1020 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an LCD (liquid crystal display) screen, an OLED (organic light emitting diode)) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 1 can include sensors that interface with a virtual reality (VR headset/HMD device 1090) to generate an AR or VR environment with foveated frames to increase framerate and/or reduce the processor cycles required for rendering. For example, one or more sensors included on a computing device 1020 or other computing device depicted in FIG. 1, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1020 can use the sensors to determine an absolute position and/or a detected rotation of the computing device in the VR space that can then be used as input to the VR space. For example, the computing device 1020 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connected to, the computing device 1020 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1020 when the computing device is incorporated into the VR space can cause a specific action to occur in the VR space.

In some implementations, a touchscreen of the computing device 1020 can be rendered as a touchpad in VR space. A user can interact with the touchscreen of the computing device 1020. The interactions are rendered, in VR headset 1090 for example, as movements on the rendered touchpad in the VR space. The rendered movements can control virtual objects in the VR space.

In some implementations, one or more output devices included on the computing device 1020 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1020 may appear as another object in a computer-generated, 3D environment. Interactions by the user with the computing device 1020 (e.g., rotating, shaking, touching a touchscreen, swiping a finger across a touchscreen) can be interpreted as interactions with the object in the VR space. In the example of the laser pointer in a VR space, the computing device 1020 appears as a virtual laser pointer in the computer-generated, 3D environment. As the user manipulates the computing device 1020, the user in the VR space sees movement of the laser pointer. The user receives feedback from interactions with the computing device 1020 in the VR environment on the computing device 1020 or on the VR headset 1090.

In some implementations, a computing device 1020 may include a touchscreen. For example, a user can interact with the touchscreen in a specific manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1020 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Figure 11A:
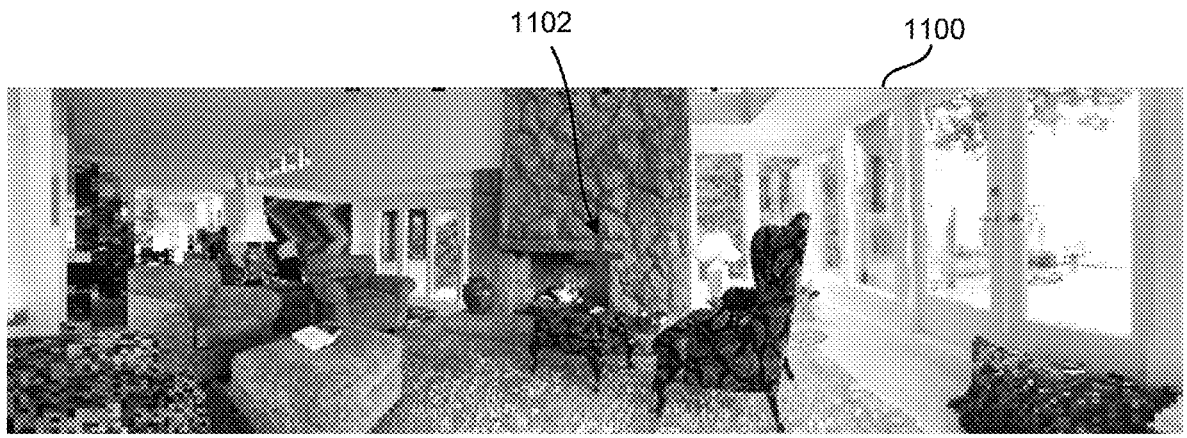
FIGS. 11A-11C are example foveated images of a scene, according to some implementations.
Figure 11B:
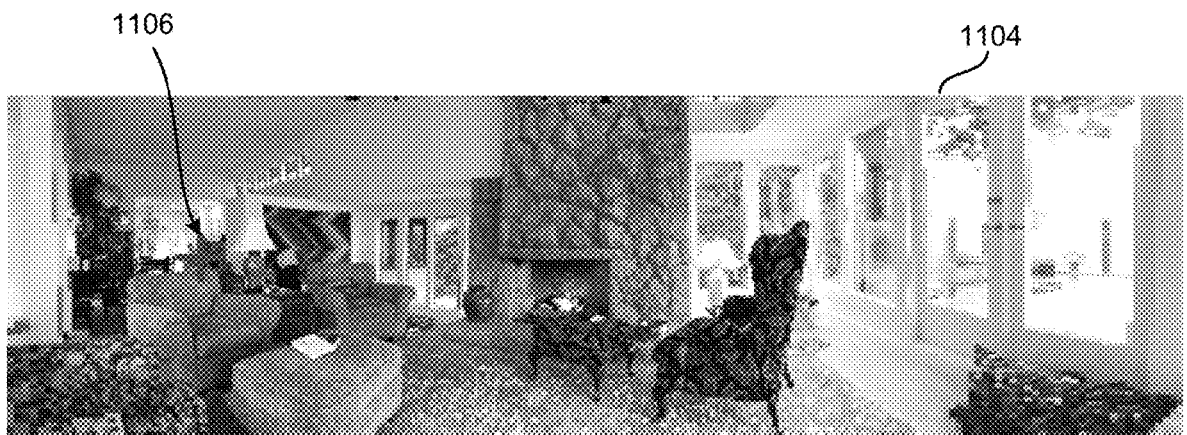
Figure 11C:

FIGS. 11A-11C include example foveated images of a scene, according to some implementations. For example, the images may be rendered by implementations of the foveated rendering engine 122. FIG. 11A includes a foveated image 1100, with a fixation point 1102 near the center of the image. FIG. 11B includes a foveated image 1104, with a fixation point 1106 near the left side of the image. FIG. 11C includes a foveated image 1108, with a fixation point 1110 near the right side of the image.

Figure 12A:
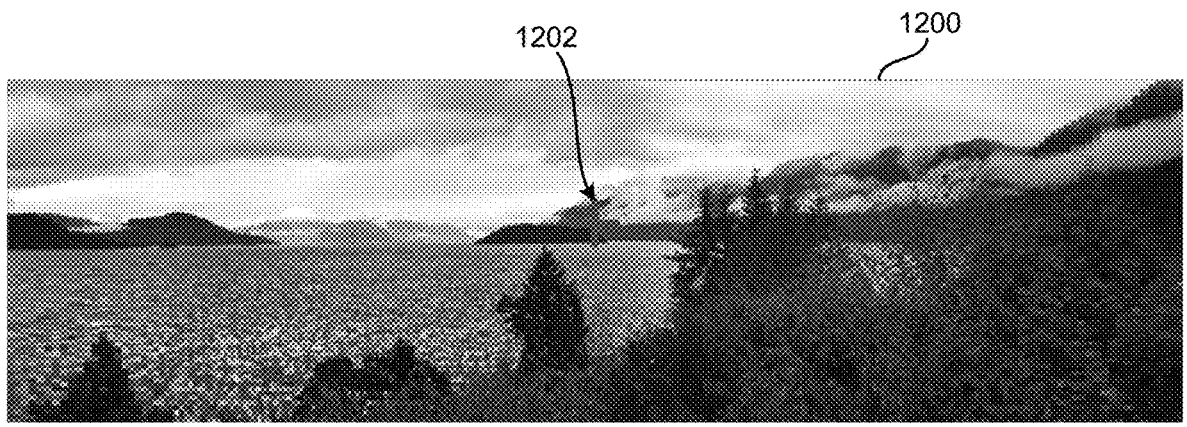
FIGS. 12A-12D are example foveated images of a scene, according to some implementations.
Figure 12B:
Figure 12C:
Figure 12D:
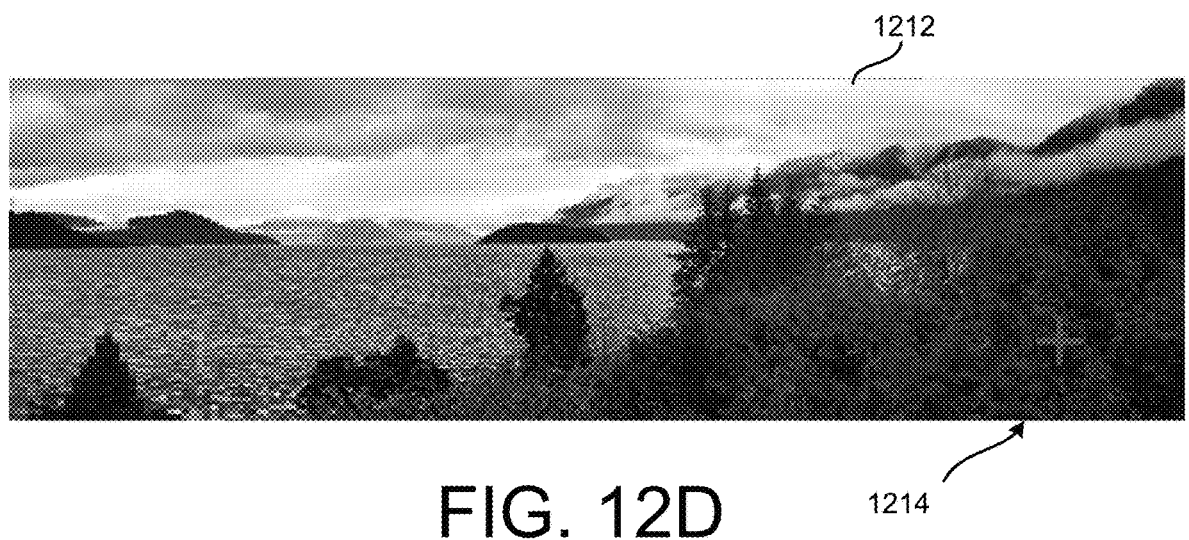

FIGS. 12A-12D include example foveated images of a scene, according to some implementations. For example, the images may be rendered by implementations of the foveated rendering engine 122. FIG. 12A includes a foveated image 1200, with a fixation point 1202 near the center of the image. FIG. 12B includes a foveated image 1204, with a fixation point 1206 near the left side of the image. FIG. 12C includes a foveated image 1208, with a fixation point 1210 near the lower, left side of the image. FIG. 12D includes a foveated image 1212, with a fixation point 1214 near the lower, left side of the image.

The images shown in FIGS. 11A-11C and 12A-12D can be generated from static images, dynamically generated images, frames from videos, or as part of a sequence of images generated within a VR environment.

A number of embodiments have been described. Nevertheless, it will be understood that various modifications may be made without departing from the spirit and scope of the specification.

In addition, the logic flows depicted in the figures do not require the specific shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In the following some examples are given.

Example 1

A method comprising: warping a 3D scene based on a fixation point; rendering the warped 3D scene to generate a first image; and unwarping the first image to generate a second image.

Example 2

The method of example 1, wherein the first image has fewer pixels than the second image.

Example 3

The method of example 2, wherein the first image has no more than a quarter of the pixels as the second image.

Example 4

The method according to any preceding example, wherein warping the 3D scene includes warping the scene using a nonlinear function of distance from the fixation point.

Example 5

The method according to any preceding example, wherein the second image is a frame from a video.

Example 6

The method according to any preceding example, wherein warping the 3D scene includes altering the 3D scene in a non-uniform manner.

Example 7

The method of example 6, wherein altering the 3D scene in the non-uniform manner includes altering different portions of the 3D scene by different amounts.

Example 8

The method of example 6, wherein altering the 3D scene in the non-uniform manner includes altering different portions of the 3D scene in different directions.

Example 9

The method according to any preceding example, wherein warping the 3D scene includes transforming vertices of the 3D scene to an intermediary compressed space.

Example 10

The method of example 9, wherein transforming the vertices to an intermediary compressed space includes applying a nonlinear function to positions of the vertices.

Example 11

The method of example 10, wherein applying a nonlinear function to the positions of the vertices includes modifying a position of each vertex of the vertices based on a square root of a distance from each vertex to a fixation point.

Example 12

The method of example 10, wherein applying a nonlinear function to the positions of the vertices includes applying logarithmic or log-polar mapping to the vertices.

Example 13

The method of example 10, wherein transforming the vertices includes: projecting each of the vertices to a viewport; projecting the fixation point to the viewport; transforming the coordinates of the projected vertices based on distances between the projected vertices and the projected fixation point; and reprojecting the transformed vertices into the 3D scene.

Example 14

The method according to any preceding example, wherein warping the 3D scene based on the fixation point includes using a warping function based on vertical distance from the fixation point and horizontal distance from the fixation point so that the 3D scene is warped to a different degree in the horizontal dimension than the vertical dimension.

Example 15

The method according to any preceding example, wherein warping the 3D scene based on the fixation point includes using an asymmetrical warping function that warps the 3D scene by a different amount on one side of the fixation point than on the other side of the fixation point.

Example 16

The method according to any preceding example, wherein rendering the warped 3D scene includes calculating error correction values for pixels of the first image based on estimating distortion of triangle edges during warping.

Example 17

The method of example 16, wherein unwarping the first image includes applying the error correction values while generating pixels of the second image.

Example 18

The method according to any preceding example, wherein unwarping the first image to generate a second image includes using bilinear filtering in a foveal region of the second image.

Example 19

The method according to any preceding example, further comprising determining the fixation point.

Example 20

The method of example 19, wherein the determining the fixation point includes determining the fixation point based on tracking the position of a user's eye.

Example 21

The method of example 19 or 20, wherein the determining the fixation point includes determining the fixation point based on properties of a lens of an HMD.

Example 22

A system comprising: at least one processor; and memory storing instructions that, when executed by the at least one processor, cause the system to: warp a 3D scene based on a fixation point; render the warped 3D scene to generate a first image; and unwarp the first image to generate a second image.

Example 23

The system of example 22, further including a graphics processing unit (GPU), wherein the instructions that cause the system to warp the 3D scene based on the fixation point include instructions that cause the system to transform the 3D scene into an intermediary compressed space using the GPU.

Example 24

The system of example 23, wherein the instructions that cause the system to warp the 3D scene based on the fixation point include instructions that cause the GPU to tessellate at least a portion of the 3D scene.

Example 25

The system of example 23, wherein the instructions that cause the system to render the warped 3D scene to generate a first image include instructions that cause the GPU to apply multi-sample anti-aliasing.

Example 26

The system according to any of the examples 22 to 25, further comprising a head-mounted display device that includes at least one lens, wherein the fixation point corresponds to a portion of the lens having higher acuity than other portions of the lens.

Example 27

The system according to any of the examples 22 to 26, further comprising a head-mounted display device and a camera, wherein the memory is further storing instructions that, when executed by the at least one processor, cause the system to: determine a position of a pupil of a wearer of the head-mounted display device based on an image captured by the camera; and determine the fixation point based on the position of the pupil.

Example 28

A non-transitory computer-readable storage medium comprising instructions stored thereon that, when executed by at least one processor, cause a computing system to at least: determine a pupil location of a wearer of a head-mounted display device; determine a fixation point based on the pupil location; warp a 3D scene based on the fixation point; render the warped 3D scene to generate a first image; unwarp the first image to generate a second image; and cause the head-mounted display device to display the second image.

Example 29

The non-transitory computer-readable storage medium of example 28, wherein the instructions configured to cause the computing system to warp the 3D scene based on the fixation point include instructions that cause the computing system to: project vertices of the 3D scene to a screen coordinate; project the fixation point to a screen coordinate; transform the coordinates of the projected vertices based on distances between the projected vertices and the projected fixation point; and reproject the transformed vertices into the 3D scene.

Example 30

The non-transitory computer-readable storage medium of example 29, wherein the instructions configured to cause the computing system to apply a logarithmic or log-polar mapping to the projected vertices.

Example 31

The non-transitory computer-readable storage medium according to any of the examples 28 to 30, wherein the 3D scene is from a sequence of 3D scenes, and the instructions further cause the computing system to: temporally alias portions of the second image based on distance from the fixation point.

What is claimed is:

1. A method comprising:
    warping a 3D scene based on a fixation point;
    rendering the warped 3D scene to generate a first image, the rendering the warped 3D scene including calculating error correction values for pixels of the first image based on estimating distortion of triangle edges during warping; and
    unwarping the first image to generate a second image by applying the calculated error correction values while generating pixels of the second image.

2. The method of claim 1, wherein the first image has fewer pixels than the second image.

3. The method of claim 2, wherein the first image has no more than a quarter of the pixels as the second image.

4. The method of claim 1, wherein warping the 3D scene includes transforming vertices of the 3D scene to an intermediary compressed space.

5. The method of claim 4, wherein transforming the vertices to an intermediary compressed space includes applying a nonlinear function to positions of the vertices.

6. The method of claim 5, wherein applying a nonlinear function to the positions of the vertices includes modifying a position of each vertex of the vertices based on a square root of a distance from each vertex to a fixation point.

7. The method of claim 5, wherein applying a nonlinear function to the positions of the vertices includes applying log-polar mapping to the vertices.

8. The method of claim 5, wherein transforming the vertices includes:
    projecting each of the vertices to a viewport;
    projecting the fixation point to the viewport;
    transforming the coordinates of the projected vertices based on distances between the projected vertices and the projected fixation point; and
    reprojecting the transformed vertices into the 3D scene.

9. The method of claim 1, wherein unwarping the first image to generate a second image includes using bilinear filtering in a foveal region of the second image.

10. The method of claim 1, further comprising determining the fixation point.

11. The method of claim 10, wherein the determining the fixation point includes determining the fixation point based on tracking the position of a user's eye.

12. The method of claim 10, wherein the determining the fixation point includes determining the fixation point based on properties of a lens of an HMD.

13. A system comprising:
    at least one processor; and
    memory storing instructions that, when executed by the at least one processor, cause the system to:
        warp a 3D scene based on a fixation point, the warping including transforming vertices of the 3D scene to an intermediary compressed space by applying a nonlinear function to positions of the vertices to map the vertices;
        render the warped 3D scene to generate a first image; and
        unwarp the first image to generate a second image.

14. The system of claim 13, further including a graphics processing unit (GPU), wherein the instructions that cause the system to warp the 3D scene based on the fixation point include instructions that cause the system to transform the 3D scene into an intermediary compressed space using the GPU.

15. The system of claim 14, wherein the instructions that cause the system to warp the 3D scene based on the fixation point include instructions that cause the GPU to tessellate at least a portion of the 3D scene.

16. The system of claim 14, wherein the instructions that cause the system to render the warped 3D scene to generate a first image include instructions that cause the GPU to apply multi-sample anti-aliasing.

17. The system of claim 13, further comprising a head-mounted display device that includes at least one lens, wherein the fixation point corresponds to a portion of the lens having higher acuity than other portions of the lens.

18. The system of claim 13, further comprising a head-mounted display device and a camera, wherein the memory is further storing instructions that, when executed by the at least one processor, cause the system to:
    determine a position of a pupil of a wearer of the head-mounted display device based on an image captured by the camera; and
    determine the fixation point based on the position of the pupil.

19. A non-transitory computer-readable storage medium comprising instructions stored thereon that, when executed by at least one processor, cause a computing system to at least:
    determine a pupil location of a wearer of a head-mounted display device;
    determine a fixation point based on the pupil location;
    warp a 3D scene based on the fixation point, the warping including:
        projecting vertices of the 3D scene to a screen coordinate,
        projecting the fixation point to a screen coordinate;
        transforming the coordinates of the projected vertices based on distances between the projected vertices and the projected fixation point by applying a logarithm-based mapping of the projected vertices, and
        reprojecting the transformed vertices into the 3D scene; and
    render the warped 3D scene to generate a first image;
    unwarp the first image to generate a second image; and
    cause the head-mounted display device to display the second image.

20. The non-transitory computer-readable storage medium of claim 19, wherein the instructions configured to cause the computing system to apply a log-polar mapping to the projected vertices.

21. The non-transitory computer-readable storage medium of claim 19, wherein the 3D scene is from a sequence of 3D scenes, and the instructions further cause the computing system to:
    temporally alias portions of the second image based on distance from the fixation point.

* * * * *